United States Patent
Fronk (10) Patent No.: US 6,181,578 B1
(45) Date of Patent: Jan. 30, 2001

(54) SYNCHRONOUS RECTIFIER DRIVE MECHANISM FOR RESONANT RESET FORWARD CONVERTERS

(75) Inventor: Karl T. Fronk, Derry, NH (US)

(73) Assignee: Astec International Limited, Hong Kong (HK)

( * ) Notice: Under 35 U.S.C. 154(b), the term of this patent shall be extended for 0 days.

(21) Appl. No.: 09/544,381

(22) Filed: Apr. 6, 2000

(51) Int. Cl.[7] .................. H02M 3/335; H02M 7/217
(52) U.S. Cl. ................................. 363/21; 363/127
(58) Field of Search .................. 363/20, 21, 125, 363/127

(56) References Cited

U.S. PATENT DOCUMENTS

| 5,392,206 | * | 2/1995 | Peterson et al. | 363/19 |
|---|---|---|---|---|
| 5,521,807 | * | 5/1996 | Chen et al. | 363/21 |
| 5,590,032 | * | 12/1996 | Bowman et al. | 363/15 |
| 5,870,299 | * | 2/1999 | Rozman | 363/127 |
| 5,956,245 | * | 9/1999 | Rozman | 363/89 |
| 6,002,597 | * | 12/1999 | Rozman | 363/21 |
| 6,011,703 | * | 1/2000 | Boylan et al. | 363/21 |
| 6,038,148 | * | 3/2000 | Farrington et al. | 363/21 |
| 6,084,792 | * | 7/2000 | Chen et al. | 363/127 |
| 6,111,769 | * | 8/2000 | Zhang et al. | 363/127 |

* cited by examiner

*Primary Examiner*—Adolf Deneke Berhane
(74) *Attorney, Agent, or Firm*—Coudert Brothers (57) ABSTRACT

A resonant reset forward converter including a gate drive mechanism for controlling the conduction periods of a free-wheeling rectifier on the secondary side of the converter is disclosed. The gate drive mechanism is operative to turn on the free-wheeling rectifier at the beginning of the forward power cycle, maintain the free-wheeling rectifier in the on state during the transformer core reset and dead periods, and provide for rapid discharging of the freewheeling rectifier at the beginning of a subsequent forward power cycle.

6 Claims, 6 Drawing Sheets

SYNCHRONOUS RECTIFIER DRIVE MECHANISM FOR RESONANT RESET FORWARD CONVERTERS

FIELD OF THE INVENTION

The present invention generally relates to resonant reset forward converters and, more particularly, to a gate drive mechanism used in connection with the rectifying element used in resonant reset forward converters.

BACKGROUND OF THE INVENTION

The most commonly used method of resetting the transformer core of a forward converter is to allow the magnetizing inductance of the transformer to ring with a combination of lumped and parasitic capacitance during the off period of the power switch that controls current flow through the primary winding of the transformer. This method is inexpensive in application and allows for minimal size converter designs.

A drawback associated with self-driven synchronous rectifiers used in resonant reset forward converters is that it is difficult to maintain a suitable gate drive charge on the synchronous rectifier during the dead period of the converter. Conventional techniques for generating alternate gate drive signals to be provided to the synchronous rectifier often require the use of additional control circuitry. This additional control circuitry is often expensive and increases the overall size of the converter.

SUMMARY OF THE INVENTION

The aforementioned and related drawbacks associated with conventional resonant reset forward converters using self-driven synchronous rectification are substantially reduced or eliminated by the resonant reset forward converter of the present invention. The converter of the present invention includes both a forward and a free-wheeling rectifier on the secondary side of the converter and associated gate drive mechanisms which control the conduction of the forward and free-wheeling rectifiers, in order to minimize current shoot-through and reduce the effects of transformer dead time. The gate drive mechanism is operative to maintain the on state of the free-wheeling rectifier during the transformer reset and dead periods, and to rapidly turn off the free-wheeling rectifier at the beginning of a subsequent forward power cycle.

In an exemplary embodiment of the present invention the converter comprises a transformer having a primary winding and a secondary winding; a power switch in series communication with the primary winding and coupled to an input power source, the power switch capable of being alternately switched between an on period and an off period such that an ac voltage is generated across the secondary winding of the transformer in response thereto, the off period including a transformer reset period and a subsequent dead period; an output filter operative to provide a substantially constant dc voltage to an output load; a forward rectifier operative to provide a forward conduction path between the secondary winding of the transformer and the output filter during the on period of the power switch; a free-wheeling rectifier operative to provide a conduction path for the output filter inductor discharge during the reset and dead periods of the transformer; means for causing the free-wheeling rectifier to be conducting during the reset period; means for maintaining the conduction state of the freewheeling rectifier during the dead period of the transformer by maintaining a suitable charge on the gate of the free-wheeling rectifier; and means for causing the free-wheeling rectifier to be non-conducting at the beginning of a subsequent on period of the power switch.

An advantage of the present invention is that it provides the ability to reduce the adverse effects of dead time in a self-driven synchronous rectified resonant reset forward converter.

Another advantage of the present invention is that it provides a converter that is highly power efficient.

Yet another advantage of the present invention is that it provides a converter that has a small footprint.

A feature of the present invention is that it can be manufactured at low cost.

BRIEF DESCRIPTION OF THE DRAWINGS

The aforementioned and related advantages and features of the present invention will become apparent upon review of the following detailed description of the invention, taken in conjunction with the following drawings, where like numerals represent like elements, in which.

DETAILED DESCRIPTION OF THE INVENTION

Figure 1:
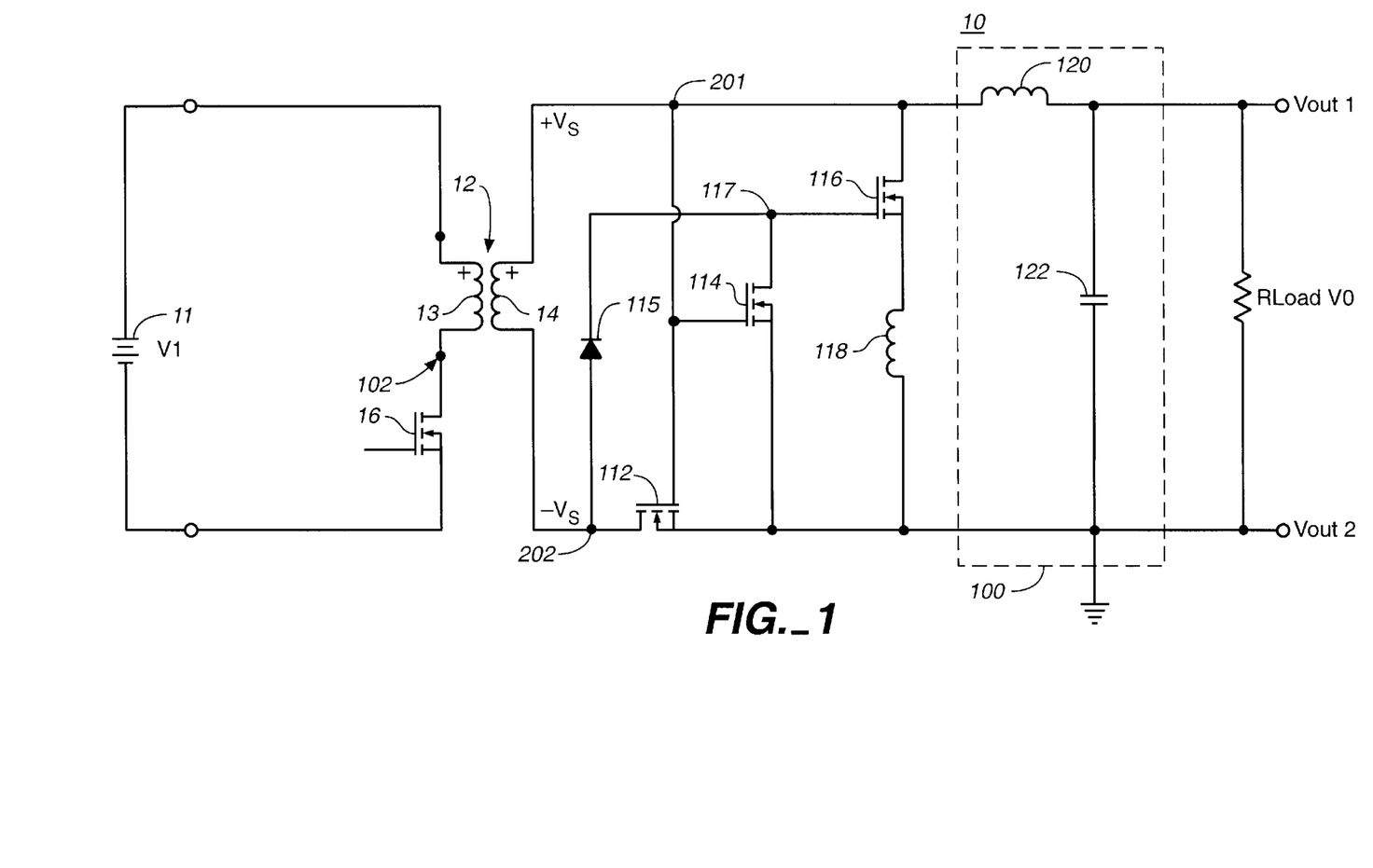
FIG. 1 is a schematic diagram of a resonant reset forward converter incorporating the synchronous rectifier gate drive mechanism according to the present invention.

The resonant reset forward converter of the present invention will now be described with reference to FIGS. 1–7. FIG. 1 is a schematic diagram of a resonant reset forward converter 10 incorporating the synchronous rectifier drive mechanism according to the present invention. In an exemplary embodiment of the present invention, a power switch 16 is connected in series with the primary winding 13 of a transformer 12 at node 102. The primary winding 13 of the transformer 12 and the power switch 16 are connected across an input dc voltage source 11. The power switch 16 is alternately switched between an on period and an off period in response to a signal applied to the control gate of the power switch 16 by a pulse width modulated (PWM) generator (not shown). The alternating states of the power switch 16 causes an ac voltage to be generated across the secondary winding 14 of the transformer 12. The signal provided by the PWM is generated in response to a feedback signal from a feedback loop (not shown) which is coupled across the output terminals $V_{out1}$ and $V_{out2}$ of the converter 10 and is responsive to the output voltage of the converter 10.

On the secondary side of the forward converter 10, the secondary winding 14 of the transformer 12 is coupled to a positive voltage rail at node 201 and a negative voltage rail at node 202. A forward rectifier 112 is coupled between the secondary winding 14 of the transformer 12 and the secondary side ground. In an exemplary embodiment, the forward rectifier 112 is a field effect transistor (FET) having a source, drain and gate. The gate of the forward rectifier 112 is coupled to node 201. The drain of the forward rectifier 112 is coupled to node 202. The source of the forward rectifier 112 is coupled to the secondary side ground. The forward rectifier 112 provides a forward conduction path between the secondary winding 14 (at node 202) and the second output terminal of the converter 10.

A free-wheeling rectifier 116 is coupled between node 201 and the source of the forward rectifier 112. In an exemplary embodiment, the free-wheeling rectifier 116 is a FET having a source, drain and gate. The drain of the free-wheeling rectifier 116 is coupled to node 201. The source of the free-wheeling rectifier 116 is coupled to a shoot-through inductor 118. The control gate of the free-wheeling rectifier 116 is connected to a secondary side diode 115. The secondary side diode 115 has an anode connected to the drain of the forward rectifier 112. The cathode of the secondary side diode 115 is connected to the gate of the free-wheeling rectifier 116. The free-wheeling rectifier 116 is operative to provide a current path between the positive voltage rail and the output terminal $V_{OUT2}$ when turned on by application of a suitable charge to its gate.

A quench FET 114 is coupled between the gate of the free-wheeling rectifier 116 and the secondary side ground and is operative to rapidly turn-off of the free-wheeling rectifier 116 at the beginning of the forward power cycle of the converter 10. In an exemplary embodiment, the drain of the quench FET 114 is coupled to the gate of the free-wheeling rectifier 116 and the cathode of the secondary side diode 115 at node 117. The source of the quench FET 114 is connected to the secondary side ground. The gate of the quench FET 114 is connected to the positive voltage rail at node 201. With this configuration, the free-wheeling rectifier 116 is maintained in a high impedance state, i.e., non-conducting state when the power switch 16 is turned on and the forward converter 10 is in the forward power cycle.

The shoot-through inductor 118: (1) initiates the discharging of the inherent drain to source capacitance, $C_{ds}$, of the free-wheeling rectifier 116 at the beginning of each forward power cycle; and (2) reduces the gate to source voltage, $V_{gs}$, across free-wheeling rectifier 116 during this transition, thereby causing the free-wheeling rectifier 116 to rapidly turn off. The quench FET 114 finishes the discharging of the free-wheeling rectifier 116 by shunting the charge present on the gate of the free-wheeling rectifier 116 to ground at the beginning of the forward power cycle. Discharging the gate of the free-wheeling rectifier 116 at the beginning of the forward power cycle prevents a large simultaneous current flow through the forward rectifier 112 and the free-wheeling rectifier 116. In a preferred embodiment, the shoot-through inductor 118 has a value of approximately 15 nH.

An output filter 100, consisting of a filter inductor 120 connected in series to a filter capacitor 122, is coupled across the output terminals $V_{out1}$ and $V_{out2}$ of the converter 10. The output filter 100 filters out any high frequency components of the ripple current present along the positive voltage rail and provides substantially ripple free, substantially constant dc output voltage $V_o$ across the output terminals of the forward converter 10. Also shown coupled across the output terminals of the forward converter is a load, $R_{LOAD}$.

Figure 2:
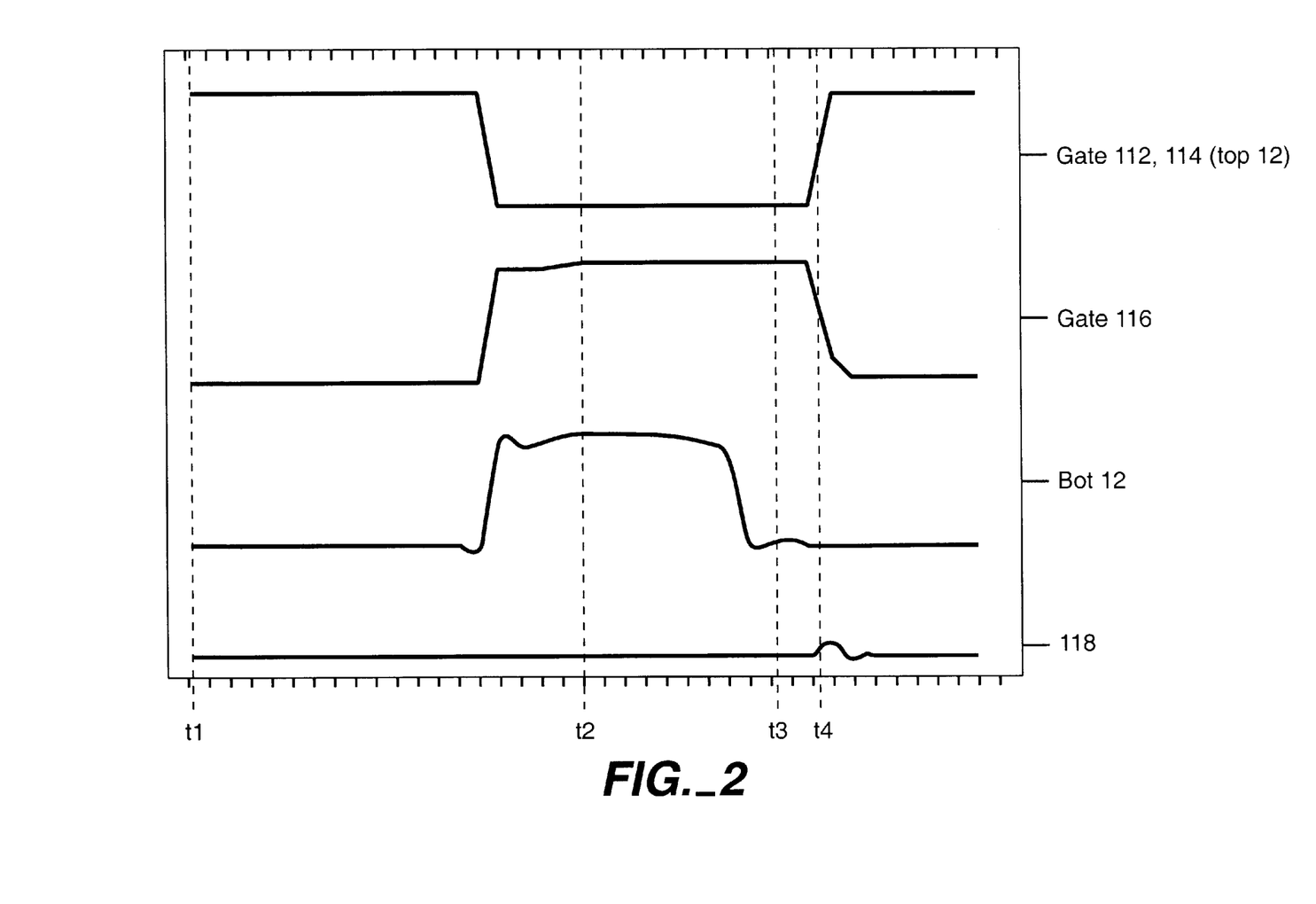
FIG. 2 is a graph illustrating a series of operational waveforms of the resonant reset forward converter illustrated in FIG. 1.
Figure 3:
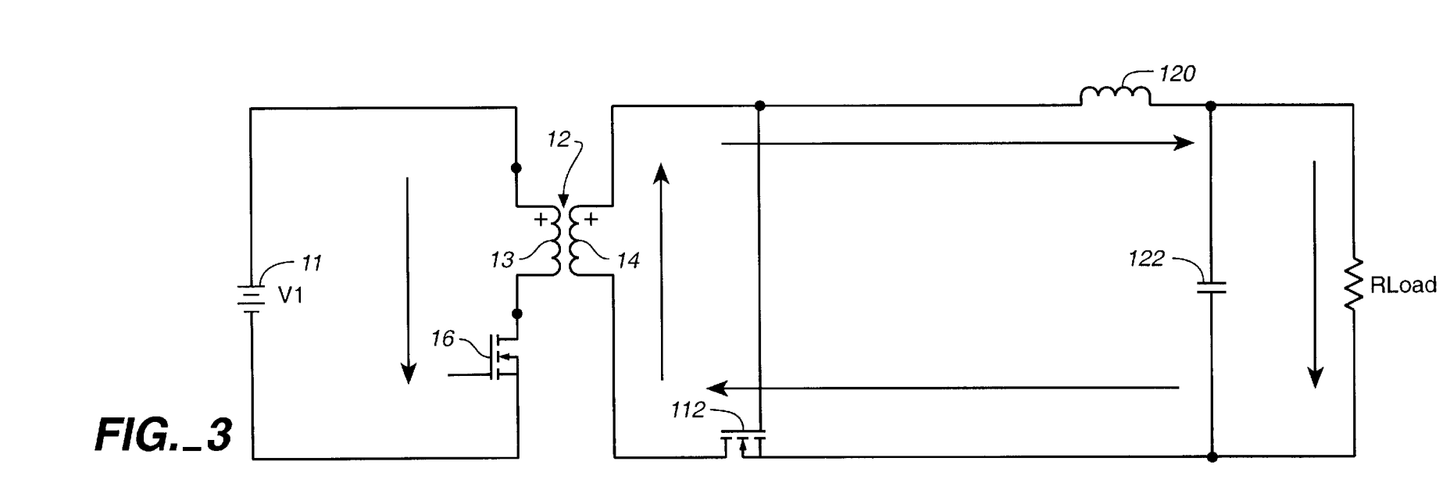
FIG. 3 is an operational schematic illustrating the conduction of current in the resonant reset forward converter illustrated in FIG. 1 during the forward power cycle.

The operation of the resonant reset forward converter of the present invention will now be described with reference to FIGS. 2–4. FIG. 2 is a graph illustrating the waveforms provided to the gate of the forward rectifier 112 and the gate of the quench FET 114, the gate of the free-wheeling rectifier 116, the voltage present across the primary side winding 13 of the transformer 12 at node 102, and the voltage across the shoot-through inductor 118.

At time t1, during the forward power cycle of the converter 10, the power switch 16 is turned on by application of a suitable voltage to the gate of the power switch. When the power switch 16 is turned on, i.e., conducting, the input voltage, $V_1$, provided by the dc voltage source is applied across the primary winding 13 of the transformer 12. This causes a secondary side voltage $V_s$ to be developed across the secondary winding 14 of the transformer 12 and is present along the positive voltage rail at node 201. The forward rectifier 112 is turned on by application of $V_s$ to its gate, thereby allowing conduction along the negative voltage rail of the forward converter 10. The quench FET 114 is also turned on, i.e. conducting by application of $V_s$ to its gate. When the quench FET 114 is conducting, the free-wheeling rectifier 116 is turned off, i.e., non-conducting. When the forward rectifier 112 is turned on, a current circulates in the secondary side of the forward converter 10 in the closed loop bounded by the secondary winding 14 of the transformer 12, filter inductor 120, $R_{load}$ and the filter capacitor 122, and the forward rectifier 112 as illustrated in FIG. 3.

At time t2, the power switch 16 is turned off, thereby removing the input voltage $V_1$ from the primary winding 13 of the transformer 12. When the power switch 16 is turned off, i.e., non-conducting, $V_s$ reverses polarity. This causes the forward rectifier 112 and the quench FET 114 to be turned off, i.e., non-conducting. After the forward rectifier 112 and the quench FET 114 are turned off, $V_s$ is passed through the secondary side diode 115 and coupled to the gate of the free-wheeling rectifier 116. During the transformer reset period, the voltage coupled to the gate of the free-wheeling rectifier 116 charges the gate capacitance of the free-wheeling rectifier 116, thereby turning the free-wheeling rectifier 116 on, i.e., it makes the free-wheeling rectifier 116 conducting across its drain to source. During the transformer reset period, the circulating current along the secondary side of the converter is maintained in a closed loop bounded by the shoot-through inductor 118, the free-wheeling rectifier 116, the filter inductor 120, and $R_{load}$ and the filter capacitor 122. In this fashion, the voltage present across the filter inductor 120 continues to charge the filter capacitor 122 and supply current to $R_{load}$.

At time t3, upon completion of the transformer reset period, $V_s$ decays to zero and the secondary side diode 115 becomes non-conductive. At this point, however, the charge stored in the $C_{gs}$ of the free-wheeling rectifier 116 is sufficient to keep the free-wheeling rectifier 116 conducting because there is no alternate low impedance conduction path from the gate of the free-wheeling rectifier 116 to ground available since the secondary side diode 115 is reversed biased and the quench FET 114 is turned off, i.e., non-conducting. As the non-conducting quench FET 114 presents a very high impedance to the charge on the gate of the free-wheeling rectifier 116, this charge is "stranded" on the gate of the free-wheeling rectifier 116 until the quench FET 114 is turned on at the beginning of the next forward power cycle.

Figure 4:
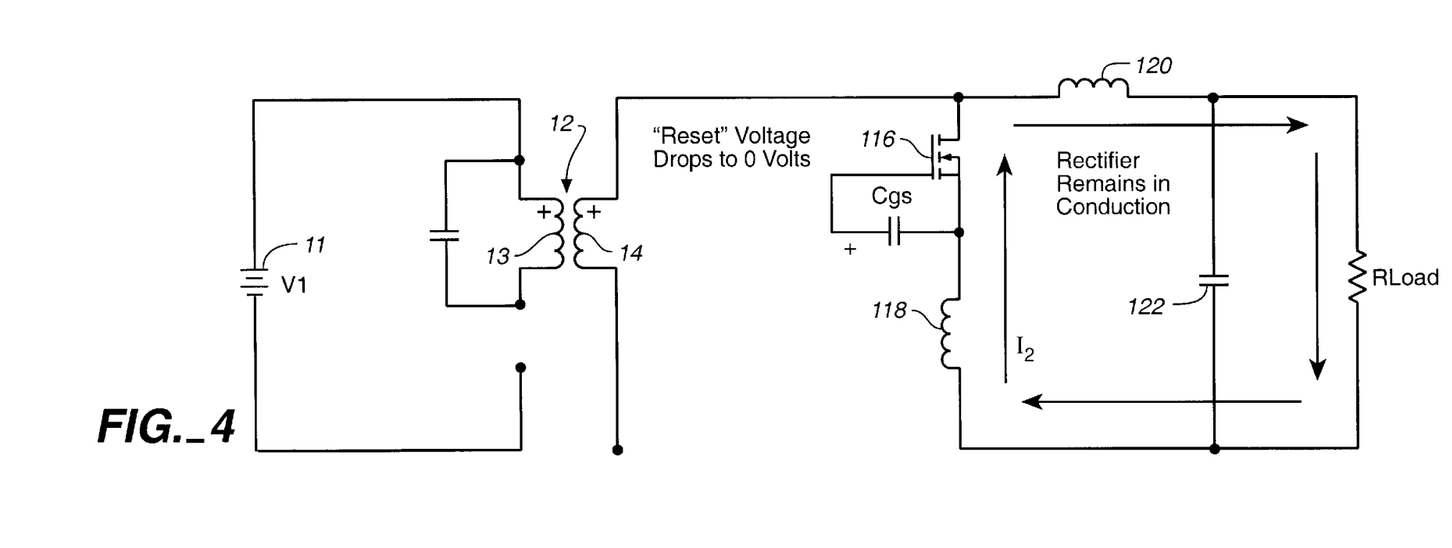
FIG. 4 is an operational schematic illustrating the conduction of current in the resonant reset forward converter illustrated in FIG. 1 during the transformer core reset and dead periods.

While the free-wheeling rectifier 116 remains on, i.e. conducting, the current along the secondary side of the converter in the closed loop bounded by the shoot-through inductor 118, the free-wheeling rectifier 116, the filter inductor 120, and $R_{load}$ and the filter capacitor 122 continues to flow as illustrated in FIG. 4. With the charge being stranded on the gate of the free-wheeling rectifier 116 by the non-conducting quench FET 114, the drive gap that is inherent in resonant reset forward converters has been effectively bridged.

At time t4, the power switch 16 is again turned on by application of a suitable voltage to its gate, thereby initiating the forward power cycle of the converter 10. When the power switch 16 is turned on, $V_1$ is again provided across the primary winding 13 of the transformer 12. The voltage across the primary winding 13 results in a voltage starting to be developed across the secondary winding 14 of the transformer 12 and present along the positive voltage rail at node 201. The forward voltage along the positive voltage rail causes a drain to source ("shoot-through") current to start flowing through the free-wheeling rectifier 116 to the shoot-through inductor 118. This current causes a voltage to rapidly (increases in magnitude more quickly than $V_s$) develop across the shoot-through inductor 118 which begins to discharge $C_{gs}$ of the free-wheeling rectifier 116 through the gate to drain capacitance $C_{gd}$ of the free-wheeling rectifier 116 and the drain to source capacitance of the quench FET 114. The discharging of the stranded charge on the gate of the free-wheeling rectifier 116 causes the drain to source resistance of the free-wheeling rectifier 116 to increase, i.e., the free-wheeling rectifier 116 starts to turn off, thereby causing the drain voltage to rise. A small increase in the drain voltage of the freewheeling rectifier 116 is coupled to the gate of the quench FET 114 which causes the quench FET 114 to turn on, i.e., become conducting. The conducting quench FET 114 thereafter rapidly discharges the stranded charge present on the gate of the free-wheeling rectifier 116 by shunting the gate of the free-wheeling rectifier to ground, thereby turning the free-wheeling rectifier 116 off. Turning the free-wheeling rectifier 116 off allows the voltage $V_s$ present at node 201 to rapidly rise and initiate a subsequent forward power cycle.

Figure 5:
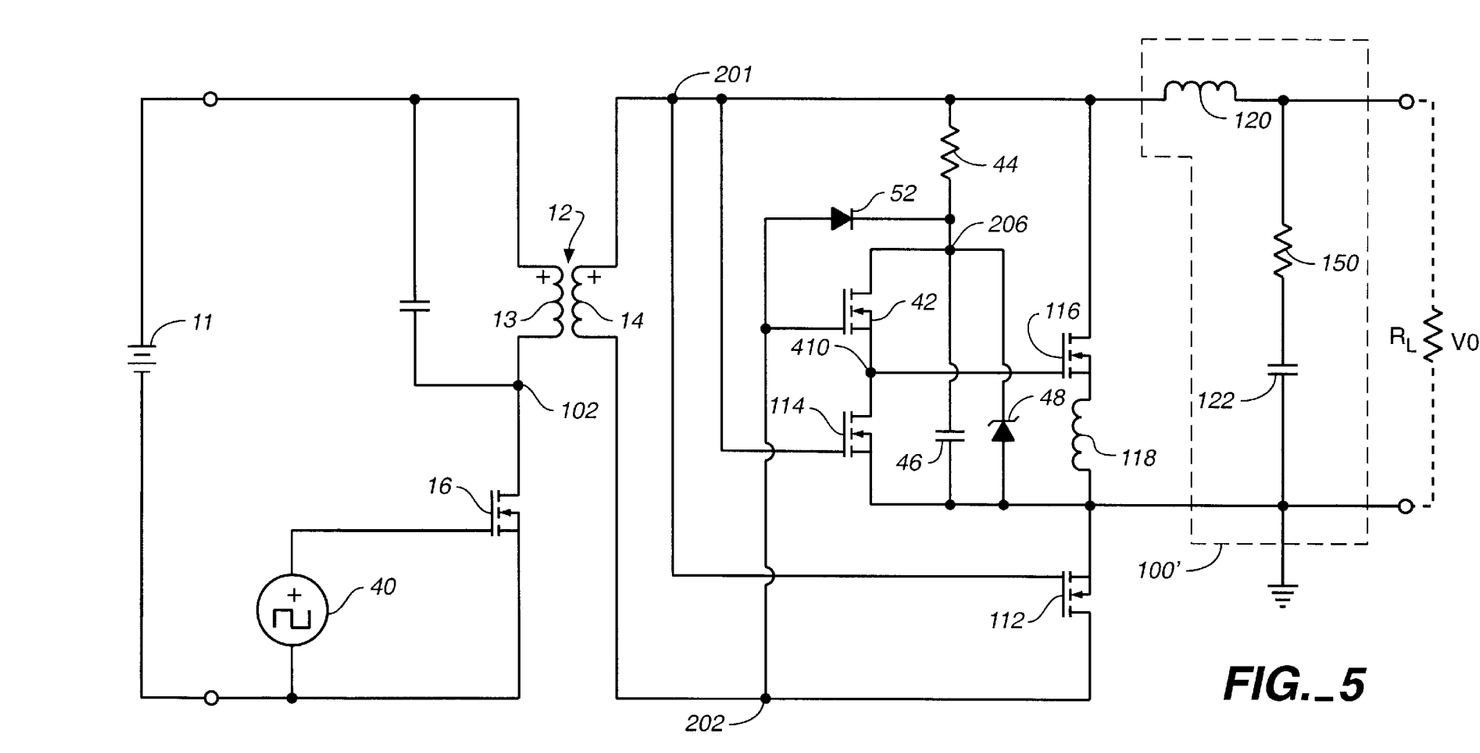
FIG. 5 is a schematic diagram of a resonant reset forward converter according to a first alternate embodiment of the present invention.

FIG. 5 is a schematic diagram of a resonant reset forward converter according to a first alternate embodiment of the present invention. As shown in FIG. 5, a power switch 16 is connected to the primary winding 13 of the transformer 12 at node 102. The gate of the power switch 16 is coupled to a square wave signal generator 40. The series combination of the primary winding 13 of the transformer 12 and the power switch 16 are connected across an input dc voltage source 11.

On the secondary side of the converter, the secondary winding 14 of the transformer 12 is coupled to node 201 and the negative voltage rail at node 202. A forward rectifier 112 is coupled along the negative voltage rail of the converter. The gate of the forward rectifier 112 is coupled to node 201. The drain of the forward rectifier 112 is coupled to node 202. The source of the forward rectifier 112 is coupled to ground and one terminal of a shoot-through inductor 118. The forward rectifier 112 provides a transfer path between the secondary winding 14 and the output terminal of the converter.

A free-wheeling rectifier 116 is coupled between node 201 and the source of the forward rectifier 112. The drain of the free-wheeling rectifier 116 is coupled to node 201. The source of the free-wheeling rectifier 116 is coupled to the other terminal of the shoot-through inductor 118. The gate of the free-wheeling rectifier 116 is connected to node 410. Node 410 is the center point of a discharge network comprising a quench FET 114 and a shadow transistor 42. The gate of the quench FET 114 is coupled to node 201. The source of the quench FET 114 is coupled to the parallel combination of capacitor 46 and zener diode 48. The drain of the quench rectifier 14 is coupled to node 410. The gate of the shadow transistor 42 is coupled to the anode of diode 52 and the negative voltage rail at node 202. The source of shadow transistor 42 is coupled to the drain of quench FET 114 at node 410. The drain of shadow transistor 42 is coupled to the parallel combination of capacitor 46 and zener diode 48 at node 206. A resistor 44 is coupled between the cathode of diode 52 and node 201. The cathode 52 is coupled to the parallel combination of the capacitor 46 and the zener diode 48. An output filter 100', comprising a series combination of a filter inductor 120, a filter resistor 150 and a filter capacitor 122, is coupled between secondary side node 201 and ground. The output filter 100' provides an essentially ripple free, substantially constant dc output voltage $V_o$ to a load $R_L$.

In operation, the discharge network operates to ensure that sufficient charge is present on the gate of the free-wheeling rectifier 116 to maintain the conducting state of the free-wheeling rectifier 116 during the dead period of the converter by charging capacitor 46 to a predetermined voltage during the forward power cycle of the converter. During the dead period of the converter, the voltage across the capacitor 46 is maintained at the gate of the free-wheeling rectifier by the zener diode 48. By using the discharge network the voltage drop across the diode 52 is compensated for.

Figure 6:
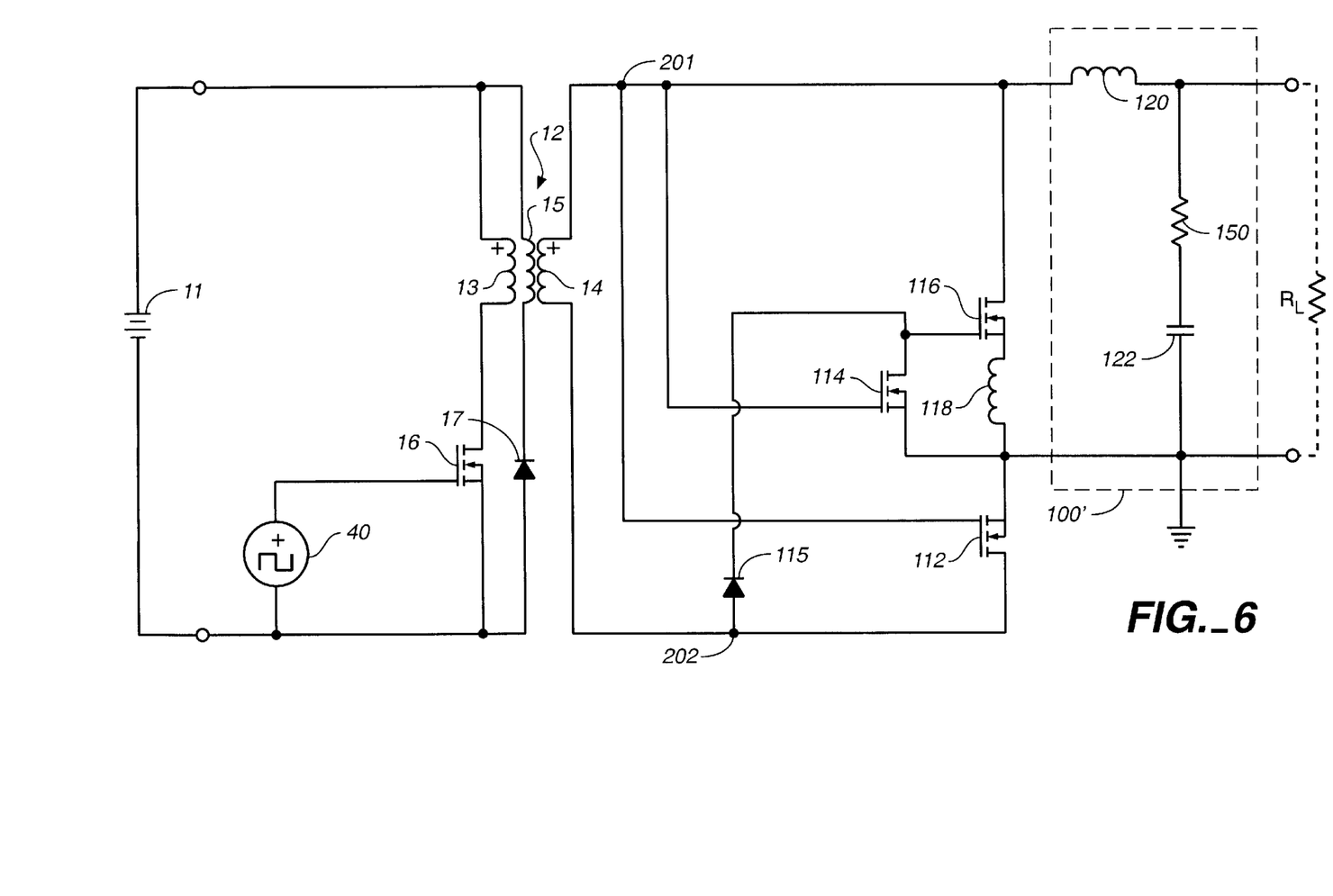
FIG. 6 is a schematic diagram of a resonant reset forward converter according to a second alternate embodiment of the present invention.

FIG. 6 is a schematic diagram of a resonant reset forward converter according to a second alternate embodiment of the present invention. Two differences between the embodiment illustrated in FIG. 6 and the embodiment illustrated in FIG. 1 are the introduction of a reset mechanism for the transformer 12 comprising a diode 17 in series communication with a third transformer winding 15 and the introduction of a filter resistor 150 in series communication between the filter inductor 120 and the filter capacitor 122 of the output filter 100'.

Figure 7:
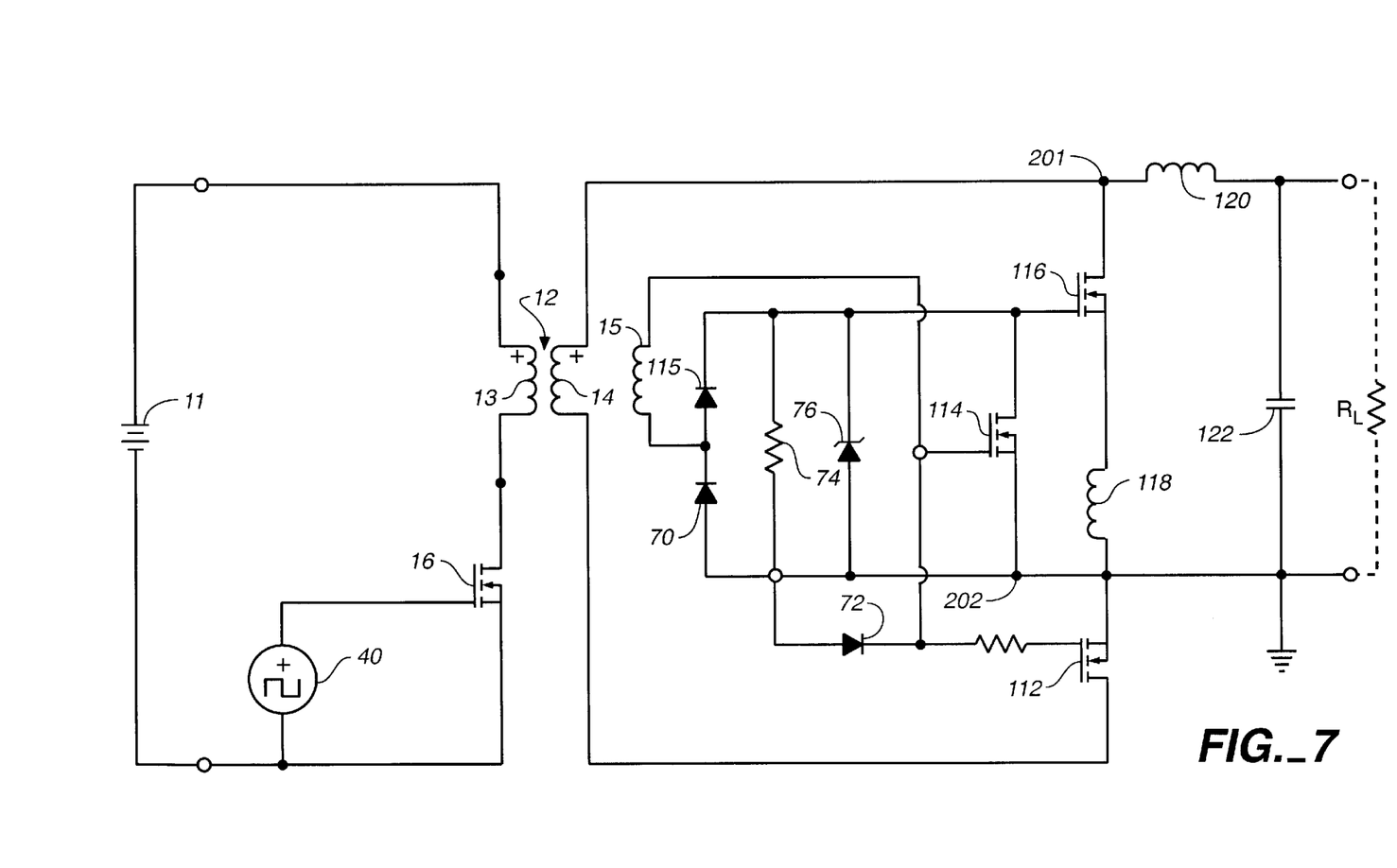
FIG. 7 is a schematic diagram of a resonant reset forward converter according to a third alternate embodiment of the present invention.

FIG. 7 is a schematic diagram of a resonant reset forward converter according to a third alternate embodiment of the present invention. The embodiment illustrated in FIG. 7 includes an auxiliary transformer winding 15 which provides the gate drive voltages to the forward rectifier 112, the quench FET 114 and the free-wheeling rectifier 116 during the forward power cycle of the converter. A sufficient amount of charge is maintained on the gate of the freewheeling rectifier 116 during the dead period of the converter due to the high impedance to the charge present on the gate of the free-wheeling rectifier 116 provided by the zener diode 76. With this configuration, the charge is stranded on the gate of the free-wheeling rectifier 116 until the quench FET 114 is turned on by application of the drive voltage provided by the auxiliary winding 15 at the beginning of the next forward power cycle. Although shown as a separate transformer winding, the auxiliary winding 15 can be integrated into the secondary winding 14 of the transformer 12. Some added benefits provided by the converter illustrated in FIG. 7 are as follows: (1) the voltages supplied by auxiliary winding 15 to the control gates of the forward rectifier 112, the quench FET 114, and the free-wheeling rectifier 116 can be scaled to be more appropriate to the particular use of the converter; and (2) the voltage present at $V_{OUT1}$ and $V_{OUT2}$ when the converter is not operating, e.g., during a "hot swap" situation, will not cause the output rectifiers to turn on and cause a short of the rail into which the converter is plugged into.

The foregoing detailed description of the invention has been provided for the purposes of illustration and description. Although exemplary embodiments of the present invention has been described in detail herein with reference to the accompanying drawings, it is to be understood that the invention is not limited to the precise embodiments disclosed, and that various changes and modifications to the invention are possible in light of the above teaching. Accordingly, the scope of the present invention is to be defined by the claims appended hereto.

What is claimed is:

1. A resonant reset forward converter, comprising:

a transformer having a primary winding and a secondary winding;

a power switch in series with said transformer and coupled to an input power source, said power switch capable of being alternately switched between an on period and an off period such that an ac voltage is generated across said secondary winding in response thereto, said off period including a transformer reset period and a subsequent dead period;

an output filter operative to provide a substantially constant dc voltage to an output load;

a forward rectifier operative to provide a forward conduction path between said secondary winding and said output filter during said on period;

a free-wheeling rectifier operative to provide a conduction path between said secondary winding and said output filter;

means for causing said free-wheeling rectifier to be conducting during said reset period;

means for maintaining the conduction state of said free-wheeling rectifier during said dead period by maintaining a suitable charge level on the gate of said free-wheeling rectifier; and means for switching said free-wheeling rectifier to a non-conducting state at the beginning of a subsequent on period.

2. The converter of claim 1, wherein said free-wheeling rectifier is a field effect transistor and said maintaining means comprises the gate to source capacitance of said field effect transistor which prevents built up charge from being dissipated from the gate of said field effect transistor.

3. The converter of claim 1, wherein said free-wheeling rectifier is a field effect transistor having a source, drain and gate, and said switching means comprises an inductor coupled to the source of said field effect transistor and a quench field effect transistor having a drain coupled to the gate of said free-wheeling field effect transistor such that an increase in voltage across said inductor during a subsequent on period causes the quench field effect transistor to dissipate the charge present on the gate of said free-wheeling rectifier.

4. The converter of claim 1, wherein said output filter comprises a inductor in series communication with a capacitor.

5. The converter of claim 1, wherein said output filter comprises a series combination of an inductor, a resistor and a capacitor.

6. The converter of claim 1, wherein said switching means includes a quench field effect transistor and said transformer includes a third winding configured to provide a gate drive signal to said forward rectifier, said quench field effect transistor and said free-wheeling rectifier.

\* \* \* \* \*